US010388001B2

(12) United States Patent
Kim

(10) Patent No.: US 10,388,001 B2
(45) Date of Patent: Aug. 20, 2019

(54) APPARATUS AND METHOD FOR COMPENSATING IMAGE DISTORTION

(71) Applicant: Hyundai Autron Co., Ltd., Seongnam-si (KR)

(72) Inventor: Kee Beom Kim, Seongnam-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 58 days.

(21) Appl. No.: 15/628,204

(22) Filed: Jun. 20, 2017

(65) Prior Publication Data

US 2017/0365044 A1 Dec. 21, 2017

(30) Foreign Application Priority Data

Jun. 20, 2016 (KR) ........................ 10-2016-0076343

(51) Int. Cl.
*G06T 5/00* (2006.01)
*G06T 3/40* (2006.01)
*G06T 3/00* (2006.01)

(52) U.S. Cl.
CPC ............ *G06T 5/002* (2013.01); *G06T 3/0018* (2013.01); *G06T 3/4007* (2013.01); *G06T 5/006* (2013.01); *G06T 2207/30252* (2013.01)

(58) Field of Classification Search
None
See application file for complete search history.

(56) References Cited

U.S. PATENT DOCUMENTS 6,215,914 B1 * 4/2001 Nakamura ........... H04N 1/3876 348/584
9,240,033 B2 * 1/2016 Li ........................... G06T 3/403
2007/0211154 A1 * 9/2007 Mahmoud ............ H04N 5/3572 348/251
2009/0022411 A1 * 1/2009 Inoue ..................... H04N 19/51 382/239
2012/0268562 A1 * 10/2012 Wang ................... H04N 13/264 348/44
2015/0042697 A1 * 2/2015 Park ..................... G09G 3/2092 345/690
2015/0055707 A1 * 2/2015 Thodiyil ............. H04N 19/433 375/240.16

(Continued)

FOREIGN PATENT DOCUMENTS

JP 2010-003014 A 1/2010
KR 10-2004-0022348 A 3/2004
KR 10-2009-0050223 A 5/2009

(Continued)

*Primary Examiner* — Kevin Ky
(74) *Attorney, Agent, or Firm* — Morgan, Lewis & Bockius LLP

(57) ABSTRACT

Provided is an apparatus for compensating an image distortion and an apparatus for compensating an image distortion according to exemplary embodiments of the present invention, which compensates distortion of an image including a plurality of image division units includes: a compensation rate setting unit setting a variable distortion compensation rate so that the plurality of respective image division units are compensated at different ratios; and a compensation unit compensating the plurality of image division units according to the variable distortion compensation rate set by the compensation rate setting unit.

6 Claims, 9 Drawing Sheets

(56) References Cited

U.S. PATENT DOCUMENTS

| | | | | |
|---|---|---|---|---|
| 2015/0093039 | A1* | 4/2015 | Li | G06T 3/4053 382/266 |
| 2017/0011490 | A1* | 1/2017 | Park | G09G 3/20 |

FOREIGN PATENT DOCUMENTS

| | | | |
|---|---|---|---|
| KR | 10-2015-0142812 | A | 12/2015 |
| KR | 10-1714213 | B1 | 3/2017 |

* cited by examiner (a)

(b)

(a)

(b)

(c)

APPARATUS AND METHOD FOR COMPENSATING IMAGE DISTORTION

CROSS-REFERENCE TO RELATED APPLICATIONS

This application claims priority to and the benefit of Korean Patent Application No. 10-2016-0076343 filed in the Korean Intellectual Property Office on Jun. 20, 2016, the entire contents of which are incorporated herein by reference.

TECHNICAL FIELD

The present invention relates to an image distortion compensating technology, and particularly, to a technology that compensates image distortion by applying a distortion compensation rate which is variable for each pixel.

BACKGROUND ART

An image lens distortion compensating technology is a technology that compensates a distorted image of a lens having a large viewing angle and is widely used in an endoscope or automobile field.

In particular, in the case of the automobile field, a method for verifying the vicinity of a vehicle includes a method for verifying the vicinity of the vehicle with naked eyes and a method for verifying the vicinity of the vehicle through a side mirror. However, according to a vehicle type, there is a vehicle in which the vicinity of the vehicle may be easily verified with the naked eyes or through the side mirror or a vehicle in which the vicinity of the vehicle may not be easily verified. In particular, in the case of a large-sized vehicle, an area which can not be confirmed only by the naked eye or the side mirror is relatively larger than that of a small-sized vehicle.

Therefore, in recent years, a technology has been developed, which uses a rear-view camera mounted on a vehicle or photographs a surrounding environment through a camera installed in each of front, rear, left, and right directions of the vehicle and outputs a peripheral image of the vehicle by combining photographed images. As such, the cameras installed in the front, rear, left, and right directions of the vehicle primarily adopt a wide-angle lens having the large viewing angle and a fish-eye lens which is a super wide angle lens having the viewing angle more than 180° is also used. However, in the case of an image photographed by using the lens having the large viewing angle like the wide-angle lens and the fish-eye lens, a refractive index increases toward a peripheral area of the image instead of providing a wide viewing angle, thereby showing an image having a crude distortion. Therefore, a scheme is required, which compensates the distortion of the image photographed by using the lens having the large viewing angle like the wide-angle lens and the fish-eye lens.

FIG. 1 is a diagram illustrating a process in which an image distortion compensating device in the related art compensates an image by using a mathematical model.

Referring to FIG. 1, the image distortion compensating device in the related art obtains a compensated pixel coordinate by substituting each pixel coordinate of a distorted image 110 in a predetermined mathematical expression and thereafter, arranges the obtained pixel coordinates and acquires a compensated image 120.

Such a method has a problem that since calculation needs to be performed with respect to all pixels, implementation complexity is high and a memory having a large capacity is required. Further, as the image is compensated by applying a fixation distortion compensation rate, there are a problem that a pedestrian 111 which exists in the distorted image 110 disappears in the compensated image 120 and a blind spot is thus generated and a problem that a perspective error in which the compensated image seems to be closer than an actual distance occurs.

FIG. 2 is a diagram illustrating a process in which the image distortion compensating device in the related art compensates the image by using a lookup table.

Referring to FIG. 2, the image distortion compensating device in the related art first obtains a changed pixel coordinate of an input image by applying a calibration algorithm to the input image to generate an input table 210. Thereafter, when all pixels are reconfigured, a result coordinate value to be moved is acquired. Thereafter, a revision table 230 is generated and stored through the result coordinate value. Thereafter, an output table 220 is generated, which is reconfigured by making the input table 210 correspond to the revision table 230. Thereafter, image distortion is compensated through the output table 220.

Such a method also has a problem that the memory having the large capacity is required because all pixel values after and before revision need to be stored. Further, there is also a problem in that since the image is enlarged to be larger than the existing image size in order to compensate the image with a distorted degree, the blind spot is generated and the perspective error in which the compensated image seems to be closer than the actual distance occurs.

SUMMARY OF THE INVENTION

The present invention has been made in an effort to minimize a blind spot generated when a distorted image is compensated by compensating the distorted image by applying a variable distortion compensation rate.

The present invention has also been made in an effort to minimize the perspective error generated when the distorted image is compensated by compensating the distorted image by applying the variable distortion compensation rate.

An exemplary embodiment of the present invention provides an apparatus for compensating an image distortion, which compensates distortion of an image including a plurality of image division units, including: a compensation rate setting unit setting a variable distortion compensation rate so that the plurality of respective image division units are compensated at different ratios; and a compensation unit compensating the plurality of image division units according to the set variable distortion compensation rate set.

The apparatus may further include an image center setting unit setting a center image division unit among the plurality of image division units and the compensation rate setting unit may set the variable distortion compensation rate so that the plurality of respective image division units are compensated at different ratios based on the center image division unit set by the image center setting unit.

The compensation unit may compensate the plurality of image division units according to the variable distortion compensation rate, and as a result, the plurality of respective image division units may move as large as a variable ratio and have image information values converted with the movement.

The apparatus may further include an interpolation unit inserting the interpolated image division units into the generated space by compensating the plurality of image division units according to the variable distortion compensation rate by the compensation unit.

The interpolation unit may insert the interpolation image division unit separately in a horizontal direction and a vertical direction based on the center image division unit.

The image information value of the interpolation image division unit may be set according to the image information values of adjacent image division units.

The apparatus may further include an image input unit into which the image including the plurality of image division units is input.

The apparatus may further include an image output unit outputting the image interpolated by the interpolation unit.

Another exemplary embodiment of the present invention provides a method for compensating an image distortion, which compensates distortion of an image including a plurality of image division units, including: compensation rate setting of setting a variable distortion compensation rate so that the plurality of respective image division units are compensated at different ratios; and compensating the plurality of image division units according to the set variable distortion compensation rate set.

The method may further include setting a center image division unit among the plurality of image division units and the setting of the compensation rate may include setting the variable distortion compensation rate so that the plurality of respective image division units are compensated at different ratios based on the set center image division unit.

The plurality of image division units may be compensated according to the variable distortion compensation rate, and as a result, the plurality of respective image division units may move as large as a variable ratio and have image information values of respective image division units converted with the movement.

The method may further include interpolating of inserting the interpolated image division units into the generated space by compensating the plurality of image division units according to the variable distortion compensation rate.

The interpolating may include inserting the interpolation image division unit separately in the horizontal direction and the vertical direction based on the center image division unit.

The image information value of the interpolation image division unit may be set according to the image information values of adjacent image division units.

According to exemplary embodiments of the present invention, a blind spot generated when a distorted image is compensated is minimized by compensating the distorted image by applying a variable distortion compensation rate.

The perspective error generated when the distorted image is compensated is minimized by compensating the distorted image by applying the variable distortion compensation rate.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
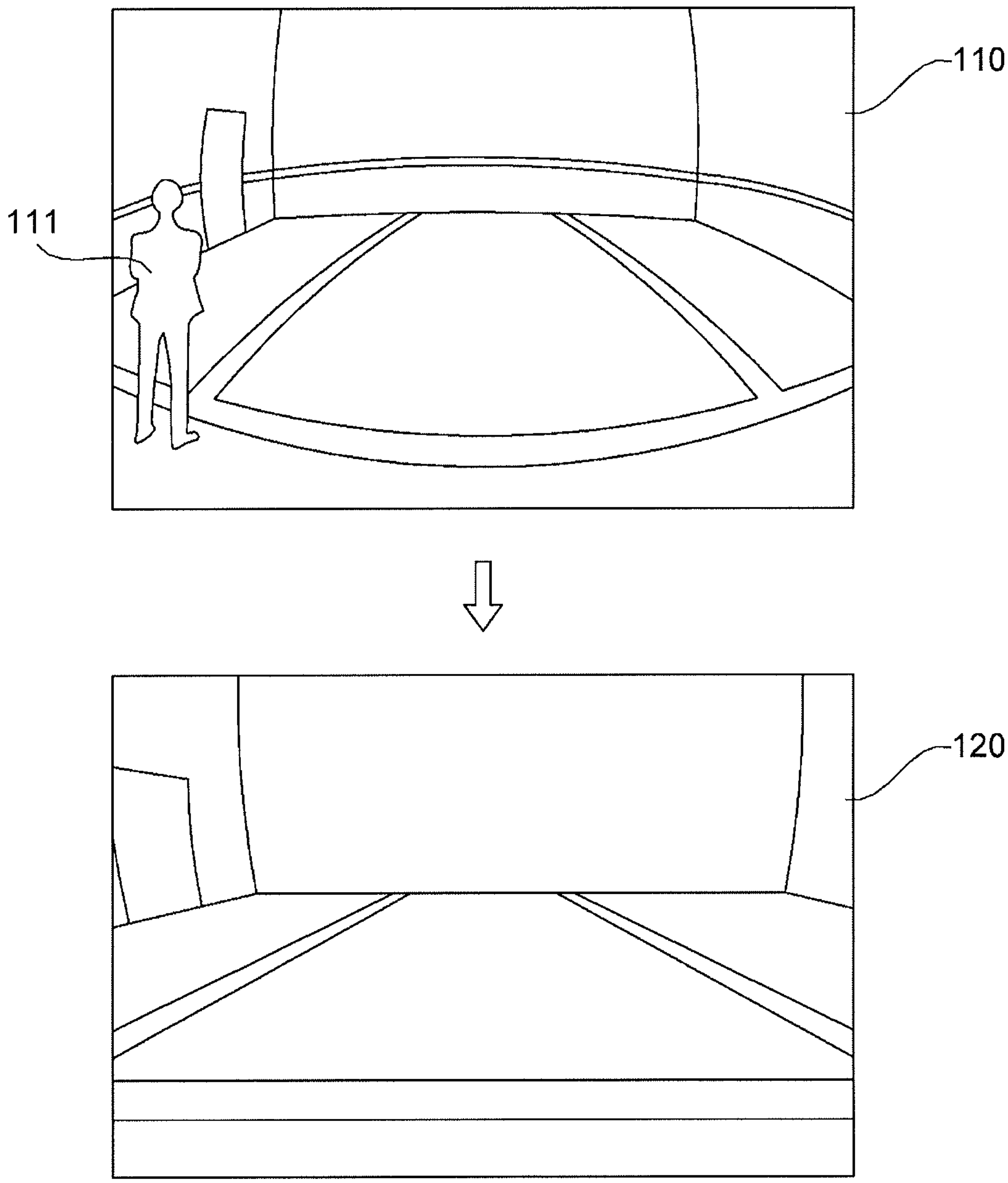
FIG. 1 is a diagram illustrating a process in which a general image distortion compensating device compensates an image by using a mathematical model.
Figure 2:
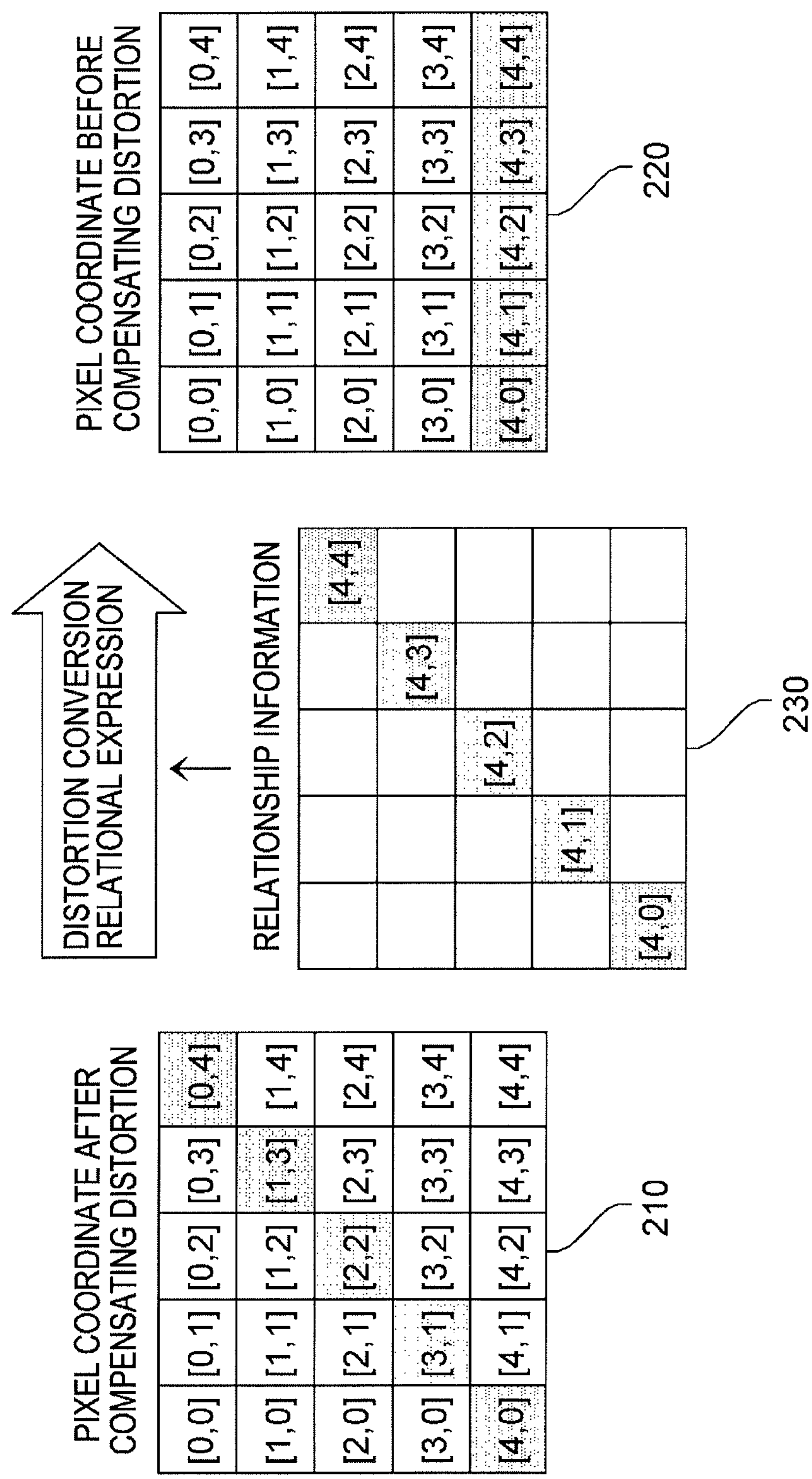
FIG. 2 is a diagram illustrating a process in which the general image distortion compensating device compensates the image by using a lookup table.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, when reference numerals refer to components of each drawing, it is to be noted that although the same components are illustrated in different drawings, the same components are denoted by the same reference numerals as possible. Further, in describing the present invention, a detailed explanation of known related configurations and functions may be omitted to avoid unnecessarily obscuring the subject matter of the present invention. Further, hereinafter, the preferred exemplary embodiments of the present invention will be described, but the technical spirit of the present invention is not limited thereto or restricted thereby and the exemplary embodiments can be modified and variously executed by those skilled in the art.

Hereinafter, an apparatus for compensating an image distortion according to an exemplary embodiment of the present invention will be described with reference to FIGS. 3 to 8.

Figure 3:
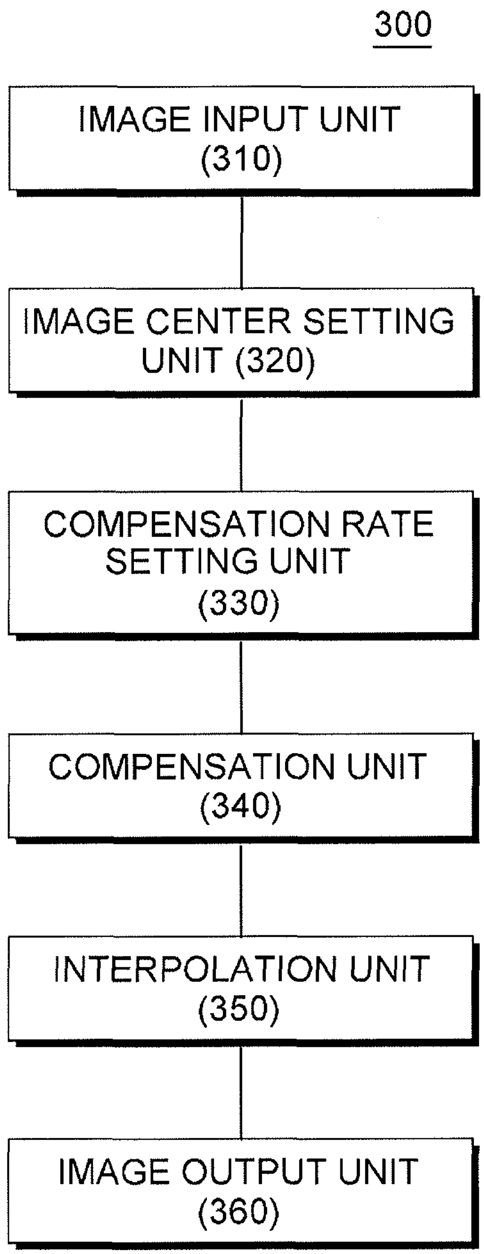
FIG. 3 is a block diagram of an apparatus for compensating an image distortion according to an exemplary embodiment of the present invention.

FIG. 3 is a block diagram of an apparatus for compensating an image distortion according to an exemplary embodiment of the present invention.

Referring to FIG. 3, an apparatus 300 for compensating an image distortion according to an exemplary embodiment of the present invention includes an image input unit 310, an image center setting unit 320, a compensation rate setting unit 330, a compensation unit 340, an interpolation unit 350, and an image output unit 360.

The image input unit 310 may be implemented to receive an image photographed by photographing equipment. The image center setting unit 320 may be implemented to set a center image division unit among a plurality of image division units. The compensation rate setting unit 330 may be implemented to set a variable distortion compensation rate so that the plurality of respective image division units are compensated at different ratios. The compensation unit 340 may be implemented to compensate the plurality of image division units according to the variable distortion compensation rate which is set in the compensation rate setting unit 330. The interpolation unit 350 may be implemented to insert the interpolated image division units into a generated space by compensating the plurality of image division units according to the variable distortion compensation rate by the compensation unit 340. The image output unit 360 may be implemented to output the interpolated image in the interpolation unit 350.

The image input unit 310 receives the image photographed from the photographing equipment. The photographing equipment includes all devices capable of photographing the image, which include a camera, a CCTV, and the like. In particular, the photographing equipment may include cameras mounted at front, rear, left, and right sides of a vehicle. In this case, the image input into the image input unit 310 from the photographing equipment may include a photograph or a moving picture. Further, the image input into the image input unit 310 includes the plurality of image division units. The image division unit means a unit which may divide the image with a predetermined size. For example, the image division unit may mean a pixel.

The image center setting unit 320 sets a center image division unit among the plurality of image division units. The image center setting unit 320 may set the image division unit at the center with respect to horizontal and vertical directions of the image as the center image division unit. Further, the image center setting unit 320 may set the image division unit in a part having a most crude distortion in the image as the center image division unit. The image center setting unit 320 may set the center image division unit by various other methods.

The compensation rate setting unit 330 may set the variable distortion compensation rate so that the plurality of respective image division units are compensated at different ratios. In this case, the compensation rate setting unit 330 may set the variable distortion compensation rate so that the plurality of respective image division units are compensated at different ratios based on the center image division unit set by the image center setting unit 320. For example, the variable distortion compensation rate may be set by the mathematical expression such as the following polynomial equation.

$$1k_1r^2+k_2r^4+k_3r^6+k_4r^1+k_2r^3+k_3r^5 \quad \text{[Equation 1]}$$

In this case, r means a distance up to the compensated image division unit in the center image division unit when it is assumed that the image is not distorted and each of $k_1$, $k_2$, $k_3$, and $k_4$ means a compensation rate function coefficient, that is, a distortion coefficient. The compensation rate setting unit 330 may set the compensation rate function coefficient by considering a lens characteristic, a camera mounting error, a camera monitoring area, and the like. The variable distortion compensation rate shown in Equation 1 is just an example and the compensation rate setting unit 330 may set the variable distortion compensation rate unlike Equation 1. Hereinafter, a process of applying the variable distortion compensation rate to the image will be schematically described with reference to FIG. 4.

Figure 4:
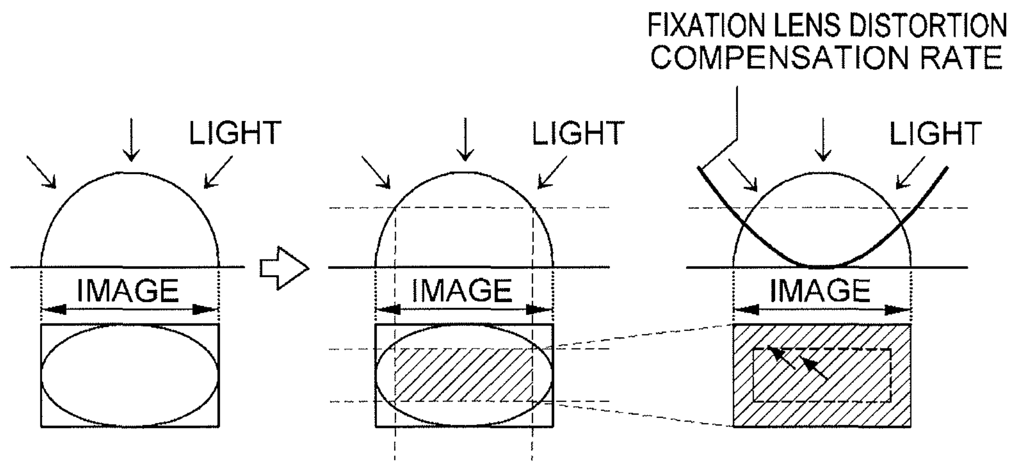
FIG. 4 is an explanatory diagram illustrating a process in which the apparatus for compensating an image distortion applies a variable distortion compensation rate according to the exemplary embodiment of the present invention.
Figure 4:
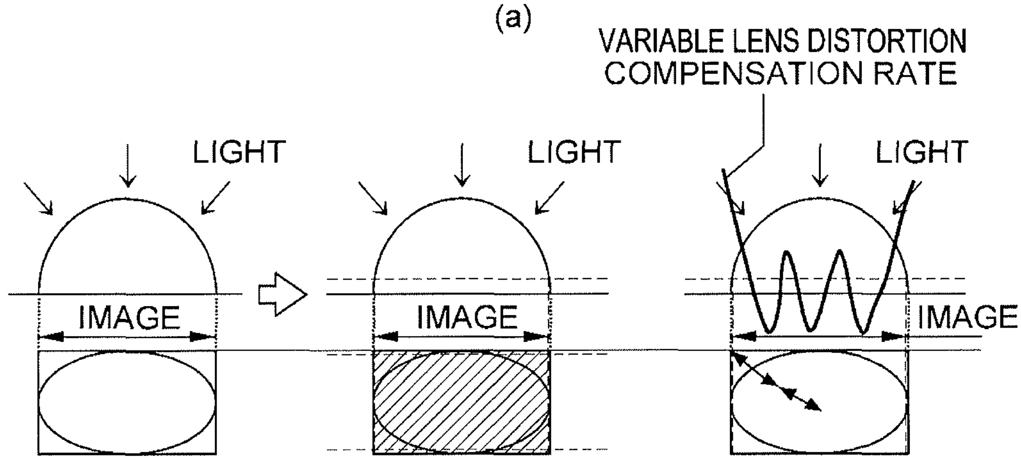

FIG. 4 is an explanatory diagram illustrating a process in which the apparatus for compensating an image distortion applies a variable distortion compensation rate according to the exemplary embodiment of the present invention. In this case, both FIGS. 4A and 4B illustrate an image acquired by applying the distortion compensation rate to an image before a leftmost part is compensated, an image after a center part is compensated, and an image before a rightmost part is compensated.

FIG. 4A illustrates a process of applying a fixation distortion compensation rate to the image. Referring to the rightmost part in FIG. 4A, it can be seen that the image is continuously enlarged toward an outer periphery from the center image division unit. Therefore, there is a problem that the image positioned in an outer peripheral part of the image before revision is removed from the image after revision.

FIG. 4B illustrates a process of applying the variable distortion compensation rate. Referring to the rightmost part in FIG. 4B, it can be seen that the image is repeatedly enlarged and reduced toward the outer periphery from the center image division unit. Therefore, it can be seen that the image positioned in the outer peripheral part of the image before revision remains in the image after revision.

The compensation unit 340 compensates the plurality of image division units according to the variable distortion compensation rate which is set in the compensation rate setting unit 330. In this case, the compensation unit 340 may compensate the plurality of image division units separately in the horizontal direction and the vertical direction based on the center image division unit. The compensation unit 340 compensates the plurality of image division units according to the variable distortion compensation rate, and as a result, the plurality of respective image division units move as large as a variable ratio and image information values of respective image division units are converted with the movement. In this case, the image information value means a pixel value when the image division unit is a pixel. This will be described below with reference to FIGS. 5 to 7.

The interpolation unit 350 inserts the interpolated image division units into the generated space by compensating the plurality of image division units according to the variable distortion compensation rate by the compensation unit 340. The interpolation unit 350 may insert the interpolation image division unit separately in the horizontal direction and the vertical direction based on the center image division unit. In this case, the image information value of the interpolation image division unit is set according to the image information values of adjacent image division units. In this case, as described above, the image information value means the pixel value when the image division unit is the pixel. Hereinafter, a process of compensating and interpolating the plurality of image division units will be described with reference to FIGS. 5 to 7.

In the following description, the description is made by premising that the image division unit is the pixel.

Figure 5:
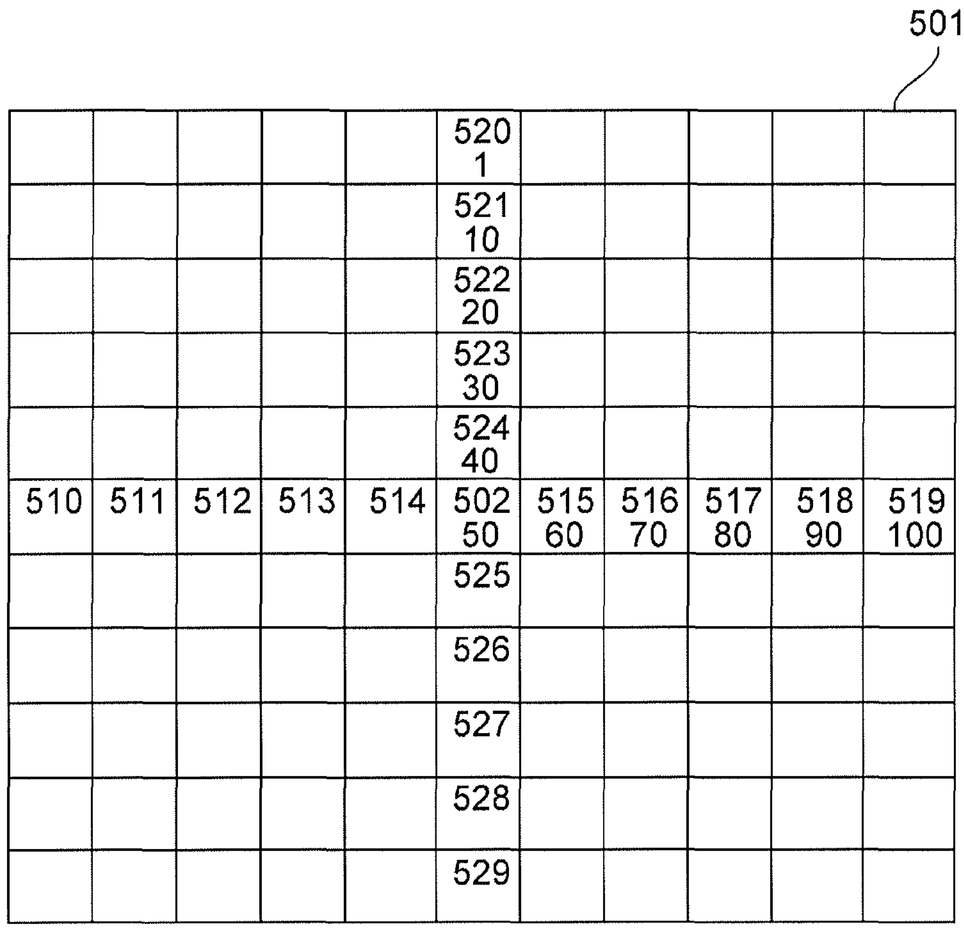
FIG. 5 is an explanatory diagram schematically illustrating a plurality of image division units of an input image.

FIG. 5 is an explanatory diagram schematically illustrating a plurality of image division units of an input image.

Referring to FIG. 5, it can be seen that an image 501 input into the image input unit 310 includes the plurality of image division units. In this case, for easy description, the image division unit at the center of the image 501 input into the image input unit 310 is premised as a center image division unit 502. Further, reference numeral 502 which is displayed in the center image division unit 502 means a position of the image division unit, a reference numeral 50 means a pixel value of the center image division unit 502, and it is premised that other image division units are also similar.

Figure 6:
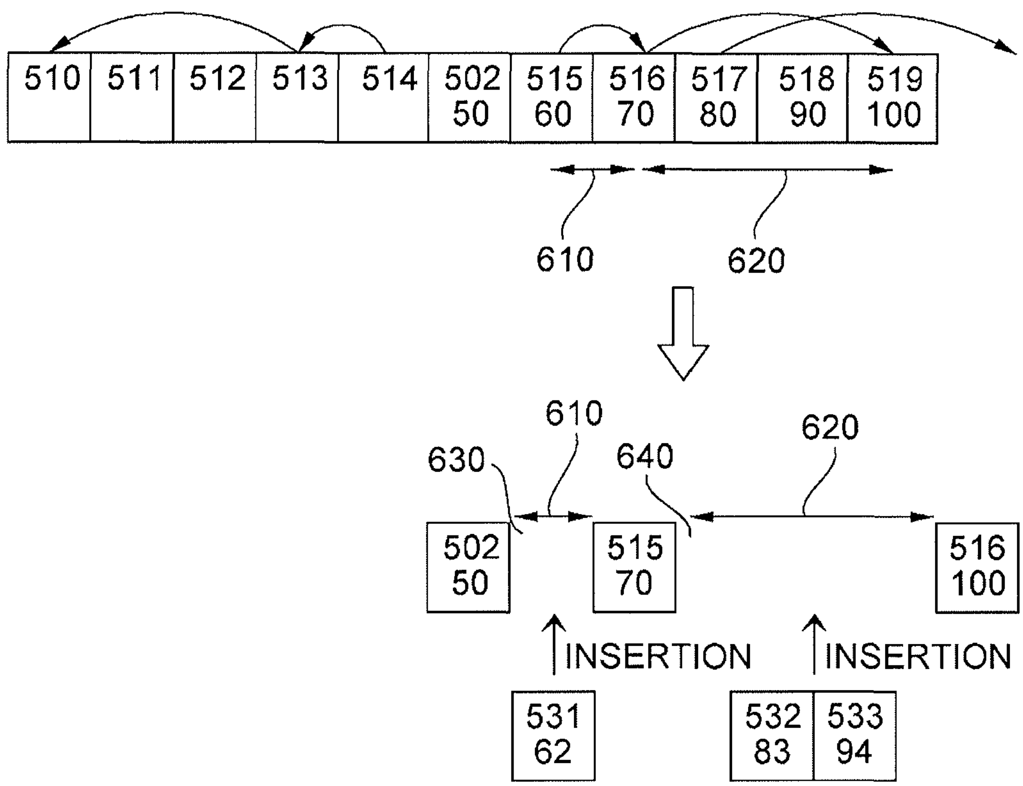
FIG. 6 is an explanatory diagram illustrating a process in which the apparatus for compensating an image distortion compensates and interpolates the image division units in a horizontal direction according to the exemplary embodiment of the present invention.

FIG. 6 is an explanatory diagram illustrating a process in which the apparatus for compensating an image distortion compensates and interpolates the image division units in a horizontal direction according to the exemplary embodiment of the present invention.

The compensation unit 340 compensates the image division units at left and right sides based on the center image division unit 502 according to the variable distortion compensation rate, and as a result, the respective image division units at the left and right sides based on the center image division unit 502 move as large as the variable ratio and the resulting pixel value is converted.

Referring to FIG. 6, a first image division unit 515 at the right side in the center image division unit 502 before revision moves to the right side as large as a variable ratio 610 to move to a position of an image division unit 516 which is positioned at a second position to the right side in the center image division unit 502 before revision. In this case, in the image division unit 515 which is positioned at a first position to the right side in the center image division unit 502 before revision, the pixel value is converted from 60 to 70. That is, the image division unit 515 positioned at the first position to the right side in the center image division unit 502 before the revision moves as large as the variable ratio 610 and the pixel value is thus converted not to have values before the revision, substantially resulting in regenerating the image division unit.

Referring to FIG. 6, an image division unit 516 at the second position to the right side in the center image division unit 502 before the revision moves to the right side as large as a variable ratio 620 to move to a position of an image division unit 519 which is positioned at a fifth position to the right side in the center image division unit 502 before revision. In this case, in the image division unit 516 which is positioned at the second position to the right side in the center image division unit 502 before revision, the pixel value is converted from 70 to 100. That is, the image division unit 516 positioned at the second position to the right side in the center image division unit 502 before revision moves as large as the variable ratio 620 and the resulting pixel value does not have values before revision, substantially resulting in regenerating the image division unit.

Meanwhile, in the example, only the process in which the respective image division units positioned at the left and right sides based on the center image division unit 502 move according to an increased ratio and the resulting pixel value is converted is described, but the image division unit moves as large as the variable ratio and a resolution is converted, and as a result, it is apparent that the respective image division units at the left and right sides based on the center image division unit 502 may move according to a reduced ratio and the result pixel value may be converted.

In the example, only the image division unit 515 positioned at the first position to the right side and the image division unit 516 positioned at the second position to the right side in the center image division unit 502 before the revision are described, but the example may be similarly applied to residual image division units at the left and right sides based on the center image division unit 502.

Thereafter, the interpolation unit 350 may insert interpolation image division units 531, 532, and 533 into spaces generated as the respective image division units at the left and right sides based on the center image division unit 502 move as large as the variable ratio. In this case, the pixel value of the interpolation image division unit is set according to the pixel values of adjacent image division units. This means that the pixel value of the interpolation image division unit is set to have a value to minimize the distortion of the image by considering the pixel values of the adjacent image division units. In detail, the pixel value of the interpolation image division unit may be set to have a predetermined value which is most influenced by the pixel values of image division units which are most adjacent to the interpolation image division unit.

For example, an interpolation image division unit 531 inserted between the center image division unit 502 and the image division unit 515 positioned at the first position to the right side in the center image division unit 502 after the revision is most Influenced by 50 which is the pixel value of the center image division unit 502 and 70 which is the pixel value of the image division unit 515 positioned at the first position to the right side in the center image division unit 502 after the revision to have 62 which is a predetermined value.

The interpolation image division units 532 and 533 inserted between the image division unit 515 at the first position to the right side in the center image division unit 502 after the revision and the image division unit 516 at the second position to the right side in the center image division unit 502 after revision are most influenced by 70 which is the pixel value of the image division unit 515 at the first position to the right side in the center image division unit 502 after revision and 100 which is the pixel value of the image division unit 516 at the second position to the right side in the center image division unit 502 after the revision to have 83 and 94 which are predetermined values, respectively.

In this case, in the example, only the case where the pixel values of the interpolation image division units 531, 532, and 533 have values among the pixel values of the adjacent image division units is illustrated, but since the corresponding pixel values have predetermined values for minimizing the distortion of the image, the corresponding pixel values may have values other than the values among the pixel values of the adjacent image division units.

Figure 7:
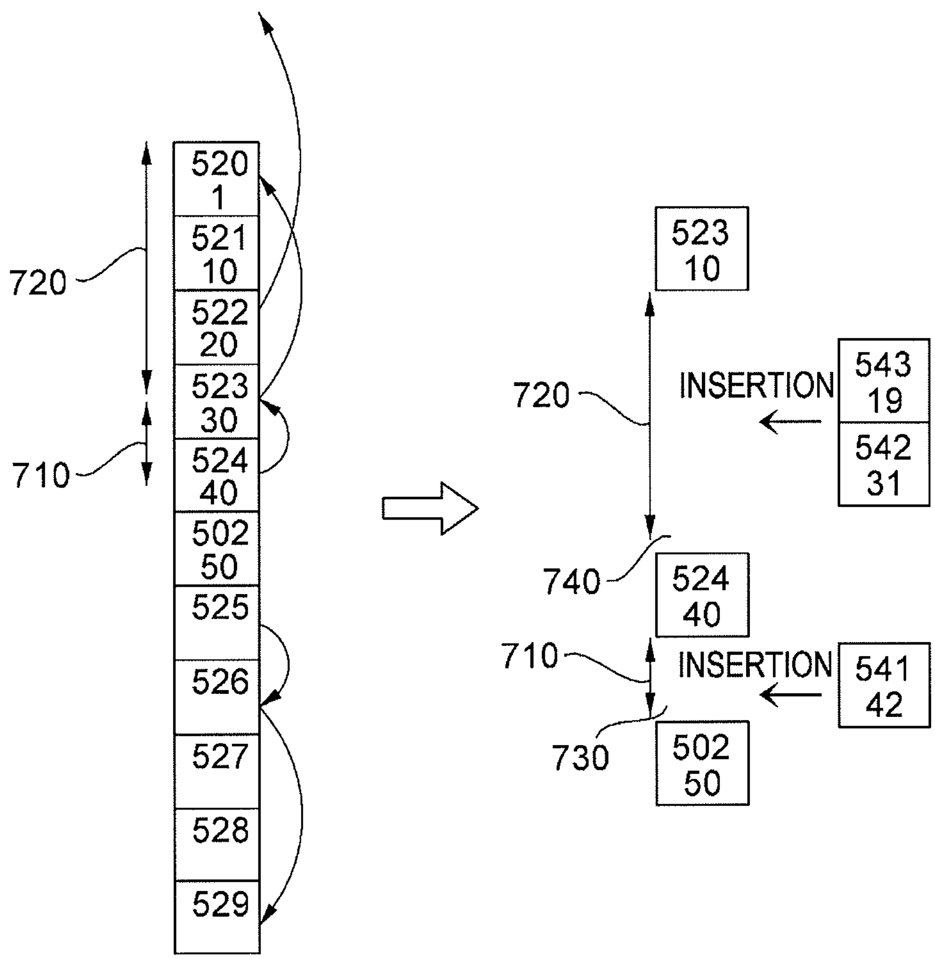
FIG. 7 is an explanatory diagram illustrating a process in which the apparatus for compensating an image distortion compensates and interpolates the image division units in a vertical direction according to the exemplary embodiment of the present invention.

FIG. 7 is an explanatory diagram illustrating a process in which the apparatus for compensating an image distortion compensates and interpolates the image division units in a vertical direction according to the exemplary embodiment of the present invention.

The compensation unit 340 compensates the image division units at upper and lower sides based on the center image division unit 502 according to the variable distortion compensation rate, and as a result, the respective image division units at the upper and lower sides based on the center image division unit 502 move as large as the variable ratio and the resulting pixel value is converted. A detailed description thereof is described with reference to FIG. 6, and as a result, the detailed description is omitted.

Thereafter, the interpolation unit 350 may insert interpolation image division units 531, 532, and 533 into spaces generated as the respective image division units at the upper and lower sides based on the center image division unit 502 move as large as the variable ratio. In this case, the pixel value of the interpolation image division unit may be set according to the pixel values of adjacent image division units. A detailed description thereof is described with reference to FIG. 6, and as a result, the detailed description is omitted.

Hereinafter, an advantage generated by compensating the distorted image by the apparatus for compensating an image distortion according to the exemplary embodiment of the present invention will be described with reference to FIG. 8.

Figure 8:
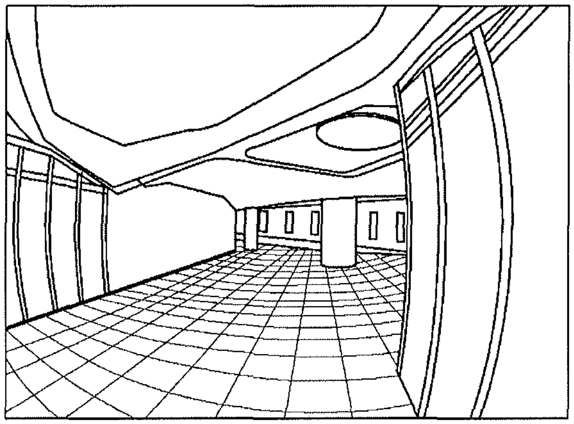
FIG. 8 is an explanatory diagram illustrating that a distorted image is compensated by the apparatus for compensating an image distortion according to the exemplary embodiment of the present invention.
Figure 8:
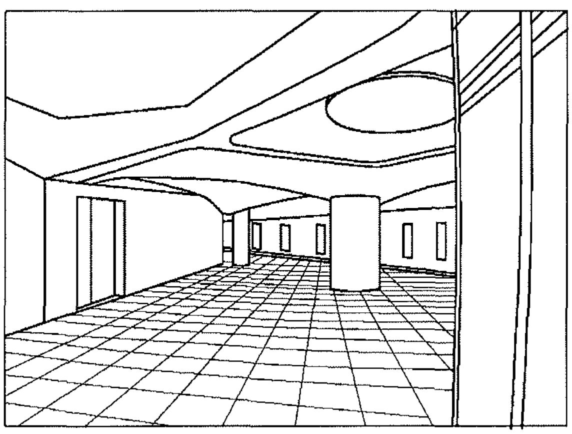
Figure 8:
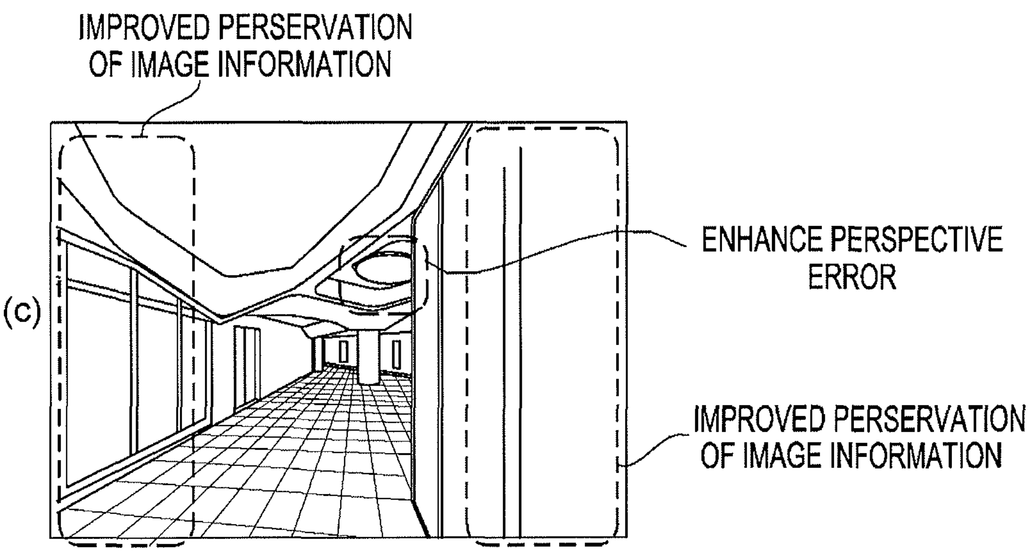

FIG. 8 is an explanatory diagram illustrating that a distorted image is compensated by the apparatus for compensating an image distortion according to the exemplary embodiment of the present invention. In this case, FIG. 8A is a diagram illustrating the image before revision, FIG. 8B is a diagram illustrating the image compensated by the image distortion compensating apparatus in the related art, and FIG. 8C is a diagram illustrating the image compensated by the apparatus for compensating an image distortion according to the present invention.

Referring to FIG. 8B, it can be seen that the image distortion compensating apparatus in the related art compensates the image according to the fixation distortion compensation rate to remove the outer periphery part in the image before revision. Further, it can be seen that the image is compensated to seem to be closer than the actual distance, and as a result, the perspective error also occurs.

However, referring to FIG. 8C, it can be seen that the image distortion compensating apparatus according to the present invention compensates the image according to the variable distortion compensation rate to conserve a distorted part in the image before revision. Further, it can be seen that the image is compensated to seem to be similar to the actual distance, and as a result, the perspective error is also minimized. That is, when the image is compensated by the apparatus for compensating an image distortion according to the present invention, the blind spot is minimized and the perspective error is minimized.

Hereinafter, a method for compensating an image distortion according to an exemplary embodiment of the present invention will be described with reference to FIG. 9. In this case, the description of a part which is duplicated with the part described with reference to FIGS. 3 to 8 is omitted.

Figure 9:
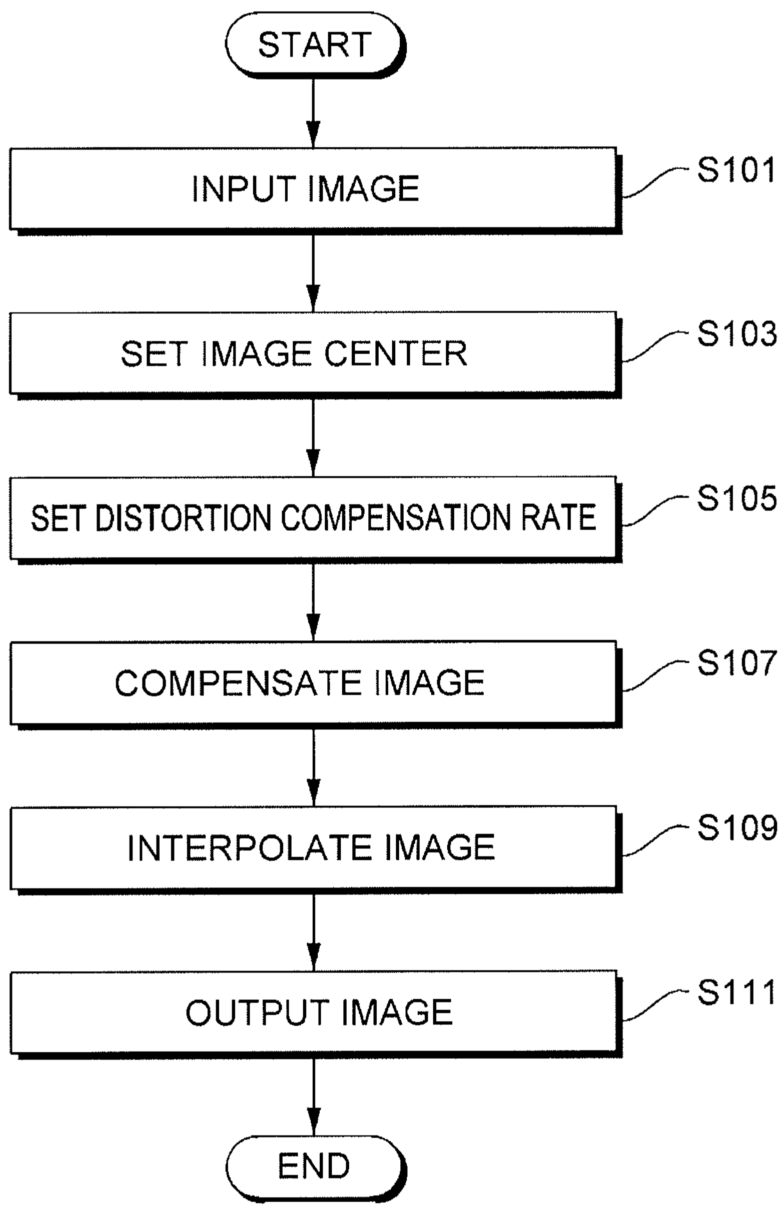
FIG. 9 is a flowchart sequentially illustrating a method for compensating an image distortion of the apparatus for compensating an image distortion according to an exemplary embodiment of the present invention.

FIG. 9 is a flowchart sequentially illustrating a method for compensating an image distortion of an apparatus for compensating an image distortion according to an exemplary embodiment of the present invention.

Referring to FIG. 9, first, the image input unit 310 receives an image including a plurality of image division units (S101).

Thereafter, the image center setting unit 320 sets a center image division unit among the plurality of image division units (S103).

Thereafter, the compensation rate setting unit 330 sets the variable distortion compensation rate so that the plurality of respective image division units are compensated at different ratios based on the center image division unit (S105).

Thereafter, the compensation unit 340 compensates the plurality of image division units according to the variable distortion compensation rate (S107).

Thereafter, the interpolation unit 350 inserts the interpolated image division units into the generated space by compensating the plurality of image division units according to the variable distortion compensation rate (S109).

Thereafter, the image output unit 360 outputs the image interpolated in step S109 (S111).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for compensating an image distortion, which compensates distortion of an image including a plurality of image division units, the method comprising:

setting a center image division unit among the plurality of image division units;

setting a variable distortion compensation rate so that the plurality of respective image division units is compensated at different ratios based on the center image division unit; and compensating the plurality of image division units according to the variable distortion compensation rate set in the setting of the variable distortion compensation rate, wherein the compensating the plurality of image division units includes:

compensating image division units at left and right sides based on the center image division unit according to the variable distortion compensation rate; and compensating image division units at upper and lower sides based on the center image division unit according to the variable distortion compensation rate; and outputting the compensated image division units by an image output unit, and wherein in the compensating, the plurality of image division units positioned at left, right, upper and lower sides based on the center image division unit is compensated in a horizontal direction and in a vertical direction with respect to the center image division unit according to the variable distortion compensation rate, and as a result, the plurality of respective image division unit moves as large as a variable ratio and have image information values of respective image division units converted with the movement of the plurality of respective image division units.

2. The method of claim 1, wherein the variable distortion compensation rate corresponding to the plurality of image division units is expressed by a polynomial function for a distance up to a corresponding image division unit from the center image division unit, and the setting of the compensation rate includes setting compensation rate function coefficients of the polynomial function in order to set the variable distortion compensation rate.

3. The method of claim 1, further comprising:

interpolating of inserting an interpolated image division unit into a generated space by compensating the plurality of image division units according to the variable distortion compensation rate in the compensating to generate an interpolated image.

4. The method of claim 3, wherein in the interpolating, the interpolated image division unit is inserted separately in the horizontal direction and the vertical direction based on the center image division unit.

5. The method of claim 3, wherein the image information value of the interpolated image division unit is set according to the image information values of adjacent image division units.

6. The method of claim 3, wherein the interpolated image is output by the image output unit.

* * * * *